United States Patent [19]

Nakatani et al.

[11] Patent Number: 5,055,886
[45] Date of Patent: Oct. 8, 1991

[54] IMAGE FORMING APPARATUS CAPABLE OF FORMING COPIED IMAGES EDITED FROM AN ORIGINAL IMAGE

[75] Inventors: Munehiro Nakatani; Hiroya Sugawa; Masamichi Kishi, all of Osaka, Japan

[73] Assignee: Minolta Camera Kabushiki Kaisha, Osaka, Japan

[21] Appl. No.: 505,666

[22] Filed: Apr. 2, 1990

[30] Foreign Application Priority Data

Apr. 3, 1989 [JP] Japan .................................. 1-85075

[51] Int. Cl.⁵ ............................................. G03G 15/01
[52] U.S. Cl. ...................... 355/326; 358/80; 346/157; 355/218
[58] Field of Search ............... 355/327, 326, 328, 206, 355/218; 346/157; 358/80

[56] References Cited

U.S. PATENT DOCUMENTS 4,922,335 5/1990 Outa et al. ............................. 358/80
4,954,888 9/1990 Fogaroli et al. .................. 358/80 X

FOREIGN PATENT DOCUMENTS 60-194469 10/1985 Japan .
62-99769 5/1987 Japan .

Primary Examiner—R. L. Moses
Attorney, Agent, or Firm—Burns, Doane, Swecker & Mathis

[57] ABSTRACT

An image forming apparatus which includes an exposing device for projecting light onto an original so as to form an electrostatic latent image of an original image on a photosensitive surface of a photoreceptor, a reading device for reading the original image through separation per predetermined color in a reading picture element unit, a designating device for designating the color to be erased, an erasing device for erasing desired region of the electrostatic latent image on the photosensitive surface of the photoreceptor per erasing picture element unit, a converting device for converting color data in the reading picture element unit into color data in the erasing picture element unit, a display device for displaying the region to be erased based on the color data in the erasing picture element unit, and a control device for controlling the erasing device based on the color data in the erasing picture element unit obtained through conversion of the color designated by the designating device, by the converting device.

22 Claims, 7 Drawing Sheets

IMAGE FORMING APPARATUS CAPABLE OF FORMING COPIED IMAGES EDITED FROM AN ORIGINAL IMAGE

BACKGROUND OF THE INVENTION

The present invention generally relates to an image forming arrangement and more particularly, to an image forming apparatus, for example, in the form of a copying apparatus for effecting formation of a copied image edited from an original image by partially erasing a latent image on a photosensitive member formed through scanning of said original image.

Electrophotographic copying apparatuses may be broadly divided into the so-called analog type copying apparatus in which a latent image is formed by projecting an original image onto a photosensitive member by a reading optical system, and the digital type copying apparatus in which a latent image is formed by an exposure optical system provided separately from the reading optical system, based on image data through quantization of photo-electric conversion signals as obtained by optically reading the original image.

Since the analog type copying apparatus widely used is arranged to effect reading of the original image and exposure of the photosensitive member by one optical system, the construction thereof may be simplified, and copied images of high resolution can be obtained by an inexpensive mechanism.

Meanwhile, the digital type copying apparatus is capable of readily effecting various image editing functions such as magnification variation, image inversion, color conversion specific to color originals, etc., in addition to the processing for improvement of image qualities by applying treatment to the image data.

Incidentally, in order to meet diverse requirements with respect to the image editing, the analog type copying apparatus has also been provided with various image editing functions up to the present.

Of the image editing functions as described above, one function frequently utilized is that for forming a copied image in which a portion of a designated color is removed with respect to a color original (referred to as a designated color removed image).

The above function is particularly effective, for example, in the case where a copied image only of characters is to be formed with respect to an original on which a predetermined portion of a row of black letters is marked with a red underline, etc.

In order to form a designated color removed image, the conventional copying apparatus includes an image sensor for reading an original image as finely divided into picture elements during scanning of the original, and an eraser for partially erasing a latent image formed on a photosensitive member per each predetermined erasing unit section, and is so arranged that, after erasing the latent image corresponding to a designated color portion within the original image by detecting color of each picture element from the output of the image sensor, toner is caused to adhere to the remaining latent image so as to form the copied image.

For the image sensor as referred to above, there is provided a sensor having a high resolving power similar to that in the reading optical system for the general digital type copying apparatus. Meanwhile, for the eraser, one having a resolving power inferior to that of the image sensor is provided from the aspect of cost reduction.

More specifically, the erasing pitch of the eraser generally employed is larger than the picture element pitch of the image sensor. For example, in a copying apparatus generally used, and employing a CCD sensor as an image sensor and an LED array for an eraser, the erasing pitch is set about 3 to 4 times that of the picture element pitch, with the area of the erasing unit section being approximately 9 to 16 times that of the picture element.

In the conventional copying apparatus as described above, there has been such a problem that before the copying function is actually effected after an operator has designated a color of an image to be removed (referred to as a designated image hereinafter) from the original image, it is impossible to confirm whether or not the image desired by the operator can be obtained. In other words, the operator is unable to ensure whether the coped image is right or wrong until the copying function is completed, and the copy paper sheet formed with the copied image has been discharged, thus not being fully confident of the result of copying work.

By way of example, in the case where it is required to make a red portion of an original image blank, such an inconvenience may occur in the copied image that the red portion and a reddish orange colored portion become blank due to an error in the color detection within the copying apparatus, or that a peripheral portion of the red color is made blank, resulting from a difference between the picture element pitch and the erasing pitch, but the operator can not foresee such a state.

As described above, if a copied image not desired by the operator is formed in some cases according to the state of the original image, the copying function at this time becomes useless, with the toner being consumed in an amount more than necessary.

Particularly, in a color copying apparatus in which the exposure and developing are repeatedly effected, waiting-time for the operator is generally long, and if the resultant copied image is one not actually desired, the amount of toner wastefully consumed becomes several times that of a single color copying apparatus.

Furthermore, in the case where the designated image and an image having the same color as the designated image, but not desired to be removed, are mixedly present in one original image, or in the case where the removal is to be stopped with respect to the portion adjacent to the image not desired to be removed in the designated image, if it is possible to correct the designated image as desired for setting, the range of utilization of the copying apparatus may be enlarged. However, in the conventional copying apparatus, the designated image is specified by the designation of color, and partial correction of the designated image can not be effected thereafter.

SUMMARY OF THE INVENTION

Accordingly, an essential object of the present invention is to provided an image forming apparatus such as a copying apparatus or the like which is capable of ensuring a region to be actually removed within an original image before effecting the copying function for an image editing.

Another object of the present invention is to provide an image forming apparatus of the above described type which is capable of correcting the region to be removed for diversification of the image editing.

In accomplishing these and other objects, according to one preferred embodiment of the present invention, there is provided an image forming apparatus which includes an exposing means for projecting light onto an original so as to form an electrostatic latent image of an original image on a photosensitive surface of a photoreceptor, a reading means for reading the original image through separation thereof per predetermined color in a reading picture element unit, a designating mans for designating the color to be erased, an erasing means for erasing desired region of the electrostatic latent image on the photosensitive surface of the photoreceptor per erasing picture element unit, a converting means for converting color data in the reading picture element unit into color data in the erasing picture element unit, a display means for displaying the region to be erased based on the color data in the erasing picture element unit, and a control means for controlling the erasing means based on the color data in the erasing picture element unit obtained through conversion of the color designated by the designating means, by said converting means.

By the arrangement according to the present invention as described above, an improved image forming apparatus has been advantageously presented, with substantial elimination of disadvantages inherent in the conventional arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
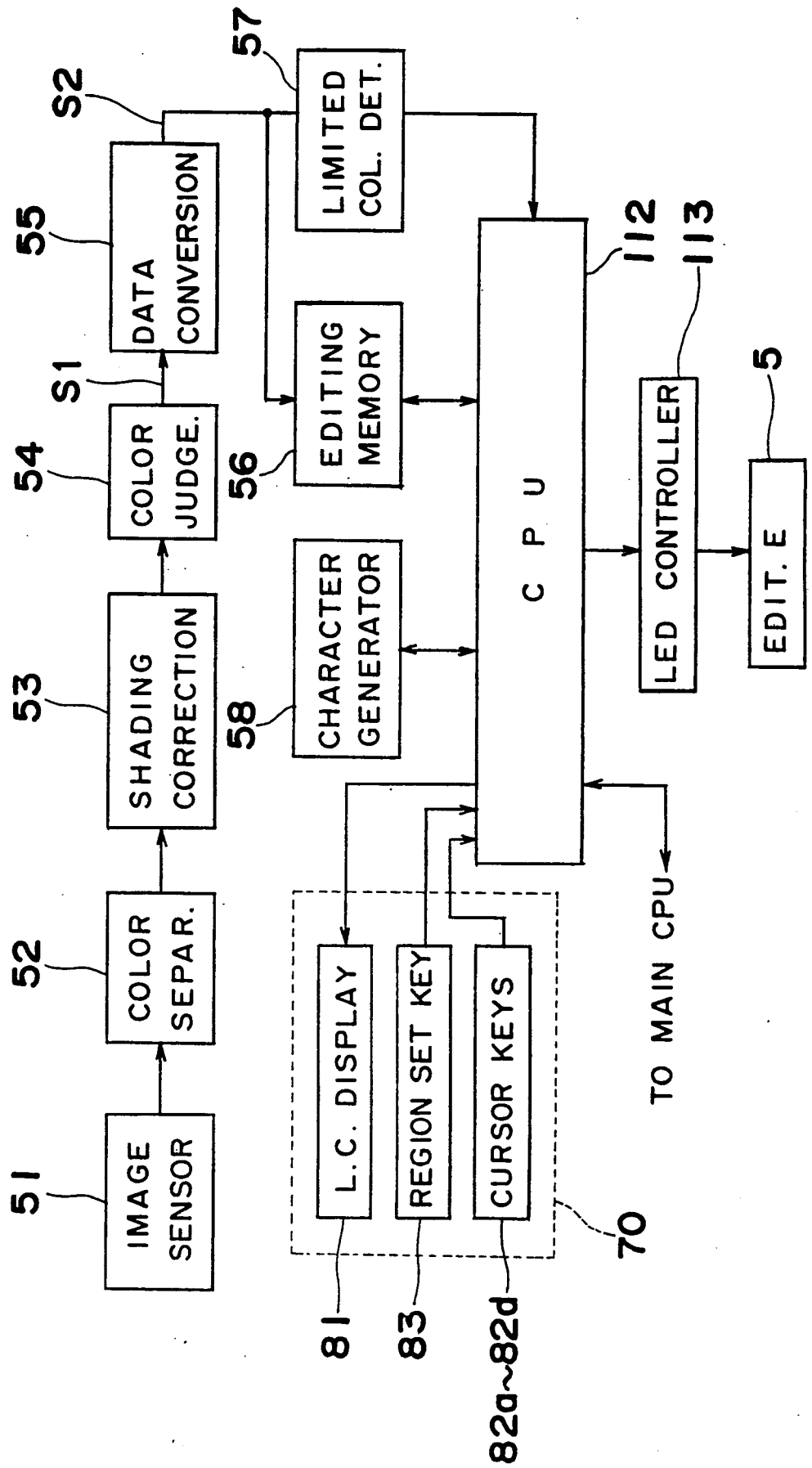
FIG. 1 is a block diagram of a control section related to driving of an editing eraser for a copying apparatus according to the present invention.

Before the description of the present invention proceeds, it is to be noted that like parts are designated by like reference numerals throughout the accompanying drawings.

Figure 2:
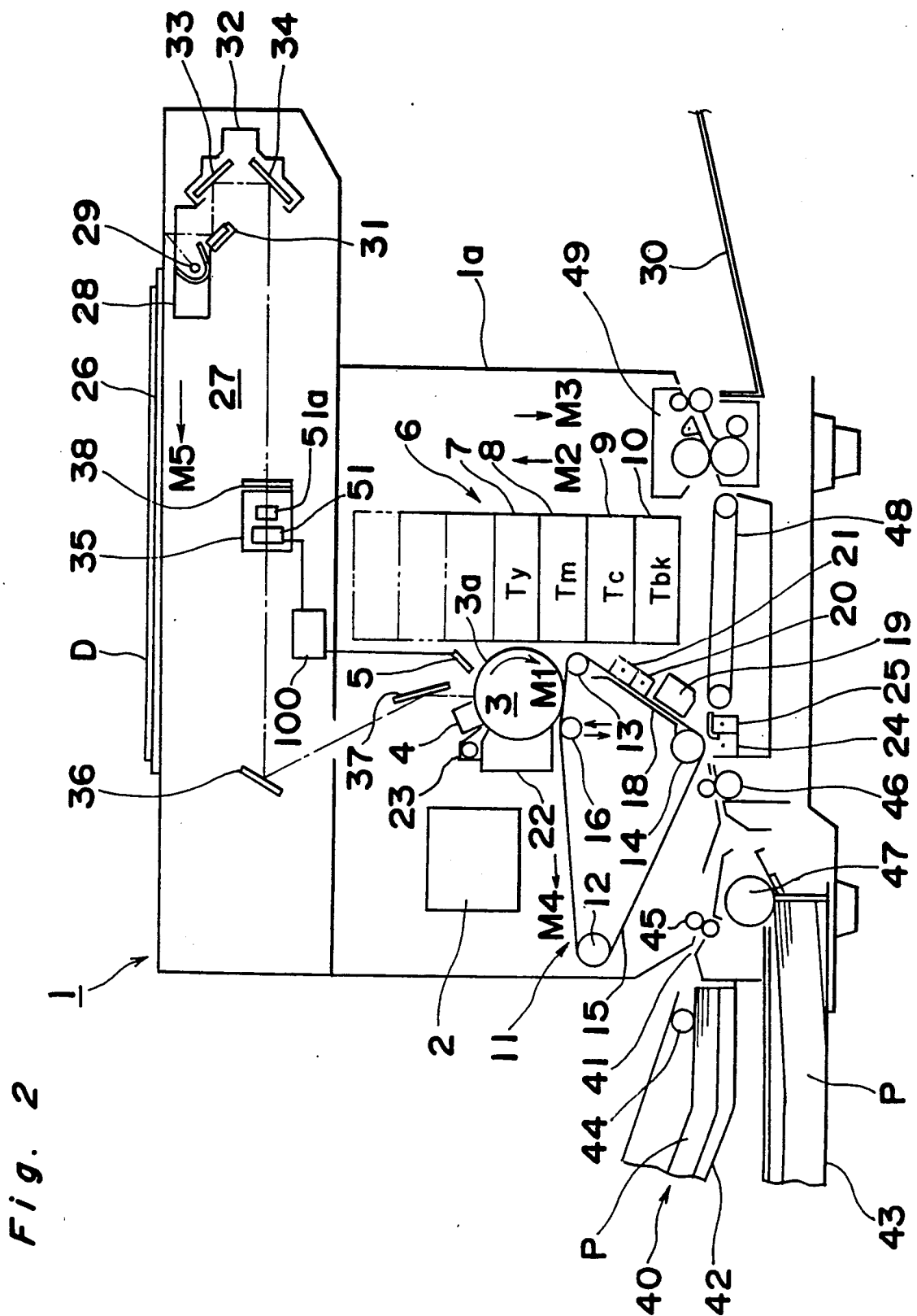
FIG. 2 is a schematic side sectional view showing a general construction of an image forming apparatus in the form of a copying apparatus according to one preferred embodiment of the present invention.

Referring now to the drawings, there is shown in FIG. 2, an electrophotographic copying apparatus 1 according to one preferred embodiment of the present invention, which generally includes a photosensitive or photoreceptor drum 3 having a photosensitive surface 3a on its outer periphery and rotatably provided at a generally central portion of an apparatus housing 1a, around which photoreceptor drum 3, there are sequentially disposed various processing units such as a corona charger 4, an editing eraser 5, a developing device 6, a transfer device 11, a cleaning device 22, and a main eraser 23, etc.

Figure 3:
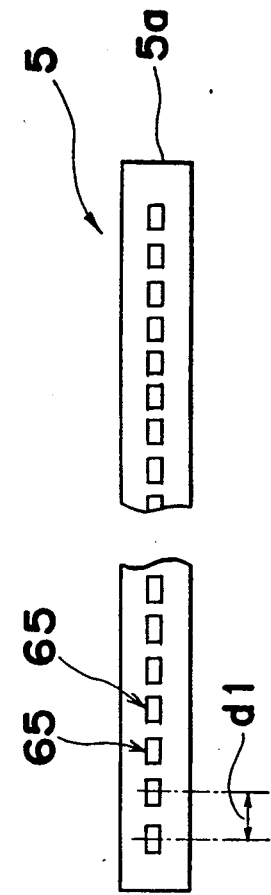
FIG. 3 is a fragmentary top plan view showing the editing eraser employed in the copying apparatus of FIG. 2.

The editing eraser 5 referred to above includes an LED array constituted by a holder 5a disposed in an axial direction of the photoreceptor drum 3, and a large number of LED's 65 arranged in one row within said holder 5a as shown in FIG. 3. The respective LED's 65 are arranged in one row to confront the surface 3a of the photoreceptor drum 3 in a direction perpendicular to the paper surface of FIG. 2 (i.e. in a main scanning direction) at an erasing pitch d1 (d1=1.2 mm), with timing for on and off thereof being controlled individually. Meanwhile, an erasing pitch in a sub-scanning direction which may be determined by a rotating speed of the photoreceptor drum 3 and a processing time for on/off control of the LED's 65, is set at 102 mm according to the present embodiment. Accordingly, the size of an erasing unit section on the surface of the photoreceptor drum 3 may be represented by 1.2 mm × 1.2 mm.

The developing device 6 includes four developing units 7,8,9 and 10 which are arranged to be simultaneously displaced in upward or downward direction (i.e. in the directions indicated by arrows M2 and M3) so as to supply toner onto the surface 3a of the photoreceptor drum 3 from any desired developing unit. In said developing units 7 to 10, there are respectively accommodated yellow toner (Ty), magenta toner (Tm), Cyan toner (Tc) and black toner (Tbk). It should be noted here that the developing device 6 is not limited in its function to one arranged to move in the vertical direction as in the above embodiment, but may be modified in various ways so long as it is able to selectively supply toner in different colors with respect to the photoreceptor drum 3.

The transfer device 11 is intended to once transfer the toner adhering to the surface 3a of the photoreceptor drum 3, onto the surface of a transfer belt 15, which is composed of an electrically conductive base made of a conductive polyester containing carbon resin, etc., and a derivative of polyethylene or the like provided on said conductive base, and is directed around and movably supported by rollers 12,13 and 14 disposed in a direction parallel to the axial direction of the photoreceptor drum 3.

Inside the loop of the transfer belt 15, a depressing roller 16 is disposed between the rollers 12 and 13, and these rollers 12,13 and 16 are adapted to move as one unit with respect to the photoreceptor drum 3, whereby through vertical upward or downward movements of the depressing roller 16 as indicated by arrows, the transfer belt 15 is selectively brought into contact with or spaced from the photoreceptor drum 3. Moreover, between the rollers 13 and 14, a guide plate 18 is disposed along the transport belt 15 inside the loop thereof, while at the outside of the belt 15, a cleaning device 19, an erasing charger 20, and a corona charger 21 are disposed, Furthermore, in a position under the roller 14, a secondary transfer charger 24 is provided to confront the transfer belt 15, with a separating charger 25 being disposed beside the secondary transfer charger 24.

At the upper portion of the copying apparatus 1, there is disposed an optical system 27 for exposing the surface of the photoreceptor drum 3 to light image of an original D. The optical system 27 is provided below and adjacent to a platen glass 26 for scanning an image of the original D placed on said platform 26 in a direction indicated by an arrow M5 (sub-scanning direction), and is constituted by a first slider 28 having an exposure lamp 29 and a mirror 31, a second slider 32 having mirrors 33 and 34, and a main lens assembly 35 with a filter 38, and fixed mirrors 36 and 37, etc. The first slider 28 is controlled to be driven for displacement at a speed V/n (n is a copying magnification) with respect to a circumferential speed V of the photoreceptor drum 3, while the second slider 32 is controlled to be driven at a speed of V/2n. For the filter 38, an infrared ray cut filter or cyan filter may be selectively used.

In the vicinity of the main lens assembly 35, there are disposed an image sensor 51 for detecting color of picture elements formed by finely dividing the original image in the formation of the color copied image and editing copied image, and a lens 51a for forming the original image on the image sensor 51 as described hereinbelow.

Although not particularly shown, the image sensor 51 is constituted, for example, by a plurality of contact type CCD chips arranged to continue in the main scanning direction. In each CCD, many light receiving elements are arranged in one row, while the respective light receiving elements are divided into three regions, and spectral filters are provided on the surfaces of the respective light receiving elements so that one of the divided regions receives light of one color of the three colors for R(red), G(green), and B(blue). Thus, one light receiving element corresponds to one picture element of the original image, and a photoelectric conversion signal corresponding to reflecting light intensity with respect to one color of the picture elements is outputted from each of the light receiving elements.

The number of effective reading picture elements of the image sensor 51 is 2250 pieces, and when the reading width for an original D is 300 mm, the picture element pitch in the main scanning direction becomes 0.4 mm. Although the picture element pitch in the sub-scanning direction may be determined by the scanning speed of the optical system 27 and charge accumulating time for the CCD, it is set to be 0.4 mm in the present embodiment. Accordingly, the size of the picture element is represented by 0.4 mm×0.4 mm, which is a value equivalent to 1/9 of the erasing unit section.

On the other hand, at a left lower portion of the apparatus hosing 1a, there is provided a paper feeding section 40 for supplying paper sheets P to form copied images thereon, while at the right lower portion thereof, a discharge paper tray 30 is provided for accommodating the paper sheets P formed with the copied images. The paper feeding section 40 includes a manual inserting section 41, an upper stage paper feeding cassette 42, and a lower stage paper feeding cassette 43 respectively provided with a set of feeding rollers 45, a feeding roller 44, and another feeding roller 47, and the copy paper sheets are supplied from any one of these manual inserting section 41, and the paper feeding cassettes 42 and 43 depending on necessity. The paper sheet P fed from the paper feeding section 40 is discharged onto the discharge tray 30 through a transport passage provided with a set of timing rollers 46, a transport belt 48 in the form of an endless belt movably supported, and a fixing device 49.

Subsequently, fundamental functions for the color copying of the copying apparatus 1 having the construction as described so far will be explained.

In the first place, upon instruction for starting the copying operation by the operator under the state where the original D is placed on the transparent original platform 26, following rotation of the photoreceptor drum 3 in the direction indicated by the arrow Ml based on the driving of a main motor 2, the outer peripheral photosensitive surface 3a of the photoreceptor drum 3 is electrically charged at a predetermined potential by the electrical discharge of the corona charger 4.

In the optical system 27, the first and second sliders 28 and 32 are respectively displaced in the direction of the arrow M5, and reflection of light irradiated form the exposure lamp 29 over the original D is projected onto the photosensitive surface 3a of the photoreceptor drum 3 through the mirrors 31,33 and 34, filter 38, lines assembly 35, and mirrors 36 and 37, whereby an electrostatic latent image of the original D (referred to as an original image hereinafter) by the projection of the reflected light is formed on the photosensitive surface 3a of said drum 3.

Thereafter, on the photosensitive surface 3a of the photoreceptor drum 3, the surface charge within a predetermined range around the latent image is erased by the editing eraser 5. Thus, adhesion of extra toner onto the photoreceptor drum 3 is prevented, thereby to form a copied image, with margins formed around peripheral edge portions of the paper sheet P. Simultaneously, based on the color of the original image a detected by the output of the image sensor 51, electrical charge in the region of the latent image not corresponding to the toner employed for the development is also erased.

It is to be noted here that, as described later, in the case where formation of the editing image is to be effected, electrical charge is partially erased also with respect to the region corresponding to the toner used for the developing.

Subsequently, at a confronting portion between the surface 3a of the photoreceptor drum 3 and the developing device 6, development is effected by the toner as supplied from a predetermined developing unit, and thus, a visible toner image is formed on the photosensitive surface 3a of the drum 3.

On the other hand, at the transfer device 11, the depressing roller 16 is moved upwardly by the driving of the main motor 2 as shown in FIG. 2, and the transfer belt 15 lightly contacts the peripheral surface 3a of the drum 3 between the rollers 16 and 13, and while being moved in a direction of an arrow M4 in the above state, said belt 15 is uniformly charged by the corona charger 21. It is to be noted here that the moving speed of the transfer belt 15 is set at the same speed as the circumferential speed of the photoreceptor drum 3.

When the toner image formed on the surface 3a of the photoreceptor drum 3 confronts the portion contacting the transfer belt 15, the toner image is subjected to a primary transfer electrostatically onto the transfer belt 15.

After the primary transfer, from the surface 3a of the photoreceptor drum 3, remaining toner is removed by the cleaning device 22, while residual charge is also erased thereon by the main eraser 23 in preparation for the subsequent exposure.

The toner image transferred onto the transfer belt 15 is transported in a direction of arrow M4 through movement of said belt 15.

The function as described so far is repeatedly effected in the order of yellow, magenta, cyan and black with respect to respective colors, and by transferring toner images formed by the respective colors onto the transfer belt 15 in an overlapped manner, the multi-color toner image may be formed. It should be noted here that the transfer belt 15 is affixed with marks, which are to be detected by a sensor (not shown) so as to effect positioning of the toner images of the respective colors transferred onto the transfer belt 15.

On the other hand, the copy paper sheet P fed from the paper feeding section 40 is sent out through the set of timing rollers 46 in a synchronized timing with the movement of the transfer belt 15, and at the confronting portion with respect to the secondary transfer charger 24, the toner image on the transfer belt 15 is subjected to secondary transfer onto the copy paper sheet P through corona discharge by the secondary transfer charger 24.

The copy paper sheet P thus transferred with the toner image is separated from the transfer belt 15 by the separating charger 25, and is fed to the fixing device 49 through the transport belt 48. At the fixing device 49, the toner image is subjected to fusion and fixing, and the copy paper sheet P on which the toner image has been fixed as the copied image is discharged onto the discharge tray 30.

It is to be noted here that, from the surface of the transfer belt 15 passing through the confronting portion with respect to the second transfer charger 24, residual toner is removed by the cleaning device 19, with residual charge being also erased therefrom by the erasing charger 20 in preparation for the subsequent transfer.

Figure 4:
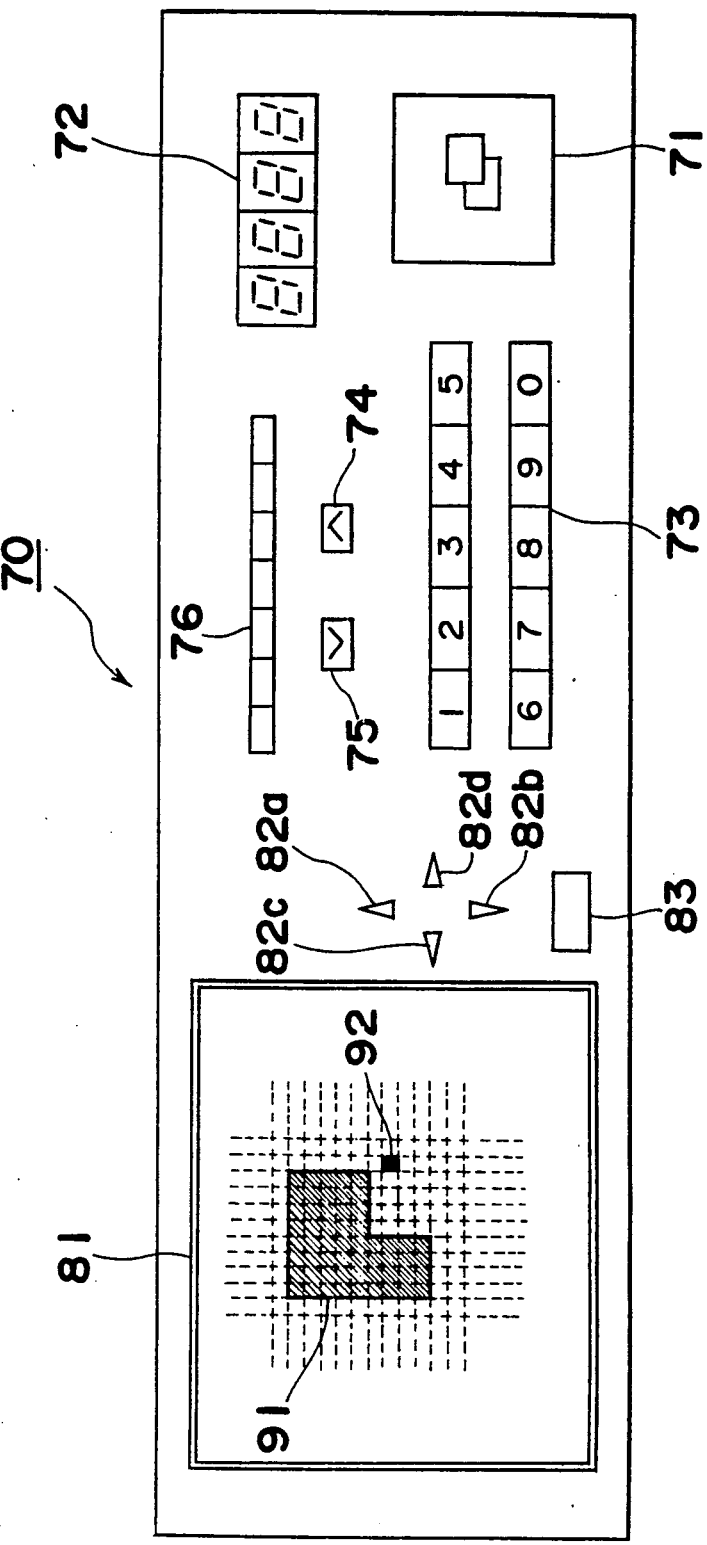
FIG. 4 is a schematic top plan view of a control panel mounted on an upper surface of the copying apparatus of FIG. 1, FIGS. 5(a) to 5(c) are diagrams showing states of data conversion by a data conversion circuit shown in FIG. 1.

Reference is further made to FIG. 4 showing a top plan view of a control panel 70 mounted on a top portion of the copying apparatus 1.

As shown in FIG. 4, on the control panel 70, there are provided a print key 71 for starting the copying function, seven segment LED's 72 for indicating copying functions such as the number of copied sheets to be taken, copying magnifications, etc., ten-keys 73 for setting copying conditions, an up key 74 and a down key 75 for changing and setting density of copied images stepwise, and density indicating LED's 76, all of which are used in the ordinary copying operation, a liquid crystal display 81 which serves as a menu screen for effecting setting of copying modes, designation for image editing, etc., cursor keys 82a to 82d for operating the menu screen, and an execution key 83 as illustrated.

On the liquid crystal display 81, selection branches and a cursor 92 are display at proper time. By selecting one of the displayed selection branches through displacement of the cursor 92 to a position of the desired selection branch with the use of the cursor keys 82a to 82d, and depressing the execution key 83, various settings and designations are to be effected.

When the setting of the image editing copying mode is effected based on the display of such a liquid crystal display 81, and formation of a designated color removed image is executed through designation of a specific color from those among the selection branches, an erasing region 91 in which the designated color portion in the image of the original D, i.e, the designated image is finely divided for each erasing unit section, and the cursor 92 are displayed as shown. The size of the cursor 92 corresponds to the size of the erasing unit section to be erased by the lighting of one LED 65 of the editing eraser 5.

In the case where the erasing region 91 being displayed is to be corrected, the cursor 92 is first displaced to the desired position. In the above case, the cursor 92 is displaced upwardly on the screen by one pitch each time the cursor key 82a is depressed, downwardly by one pitch each time the cursor key 82b is depressed, towards the left side of the screen by one pitch each time the cursor key 82c is depressed, and towards the right side on the screen also by one pitch each time the key 82d is depressed. Then, upon depression of the execution key 83, the erasing unit section corresponding to the position of the cursor 92 is set as the erasing region 91. If the execution key 83 is again depressed at the same position, the previous setting is released.

FIG. 1 shows a block diagram of a control section 100 related to driving of the editing eraser 5 for the copying apparatus 1.

Respective portions of the control section 100 are controlled by a main CPU (central processing unit) for controlling the copying functions as described so far, and a CPU (central processing unit) 112 for effecting transmission and reception of various data and control signals.

As shown in FIG. 1, the image sensor 51 is connected through a color separation circuit 52, a shading correction circuit 53, and a color judging circuit 54, to a data conversion circuit 55, which is further coupled with the CPU 112 via a limited color detection circuit 57 and an image editing memory 56, with a character generator 58 and the control panel including the liquid crystal display 81, region setting key 83, and cursor keys 82a to 82d, etc. being further coupled with said CPU 112, which is further connected to the editing eraser 5 through an LED controller 113, and also, to the main CPU (not particularly shown).

Firstly, the photo-electric conversion signals serially outputted from the image sensor 51 for each picture element (reading unit) in the order of red, green and blue are properly amplified by the color separation circuit 52, and thereafter, quantized by A/D conversion for each color so as to be converted into the image data for each color. The image data for each color thus obtained is parallelly fed to the shading correction circuit 53 per each picture element.

In the shading correction circuit 53, based on a reference data obtained by reading a white reference plate (not shown) provided on the transparent original platform 26, shading corrections corresponding to sensitivity characteristics of the image sensor 51, and light distribution of the exposure lamp 29 in the main scanning direction (irregular light amount), etc., are effected.

Meanwhile, in the color judging circuit 54, through utilization of a ROM table for judgement provided therein, it is judged to which of the seven colors yellow, magenta, cyan, black, red, green, and white, the color of each picture element corresponds, by the mutual percentage of image data for the respective colors, and thus, a read color data S1 corresponding to the color of each picture element is outputted from the color judging circuit 54.

The read color data S1 corresponding to each picture element, i.e. to the reading unit section by the image sensor 51, at the data conversion circuit 55, is converted into an erase color data S2 corresponding to the erasing unit section by the editing eraser 5.

Figure 5A:
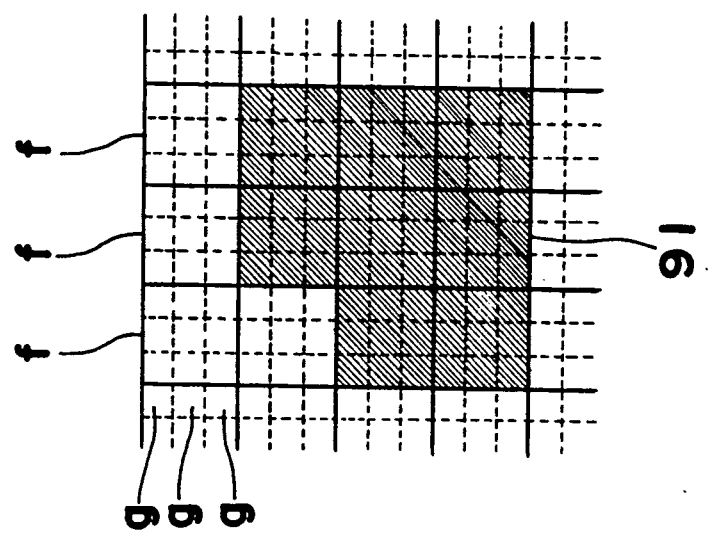
Figure 5B:
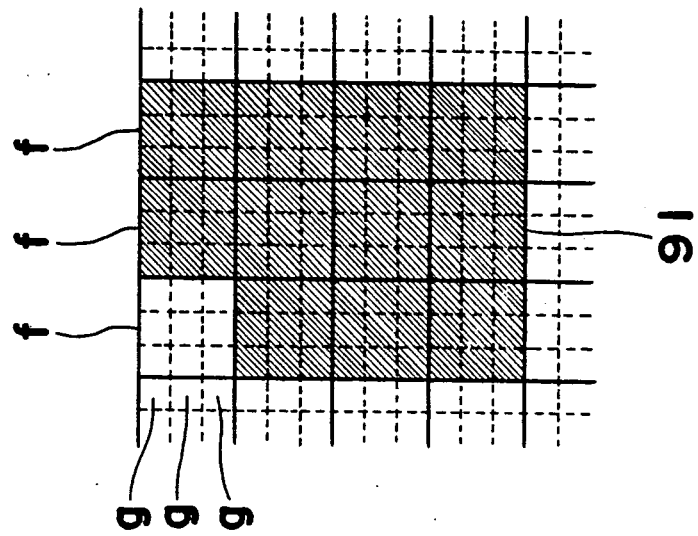
Figure 5C:
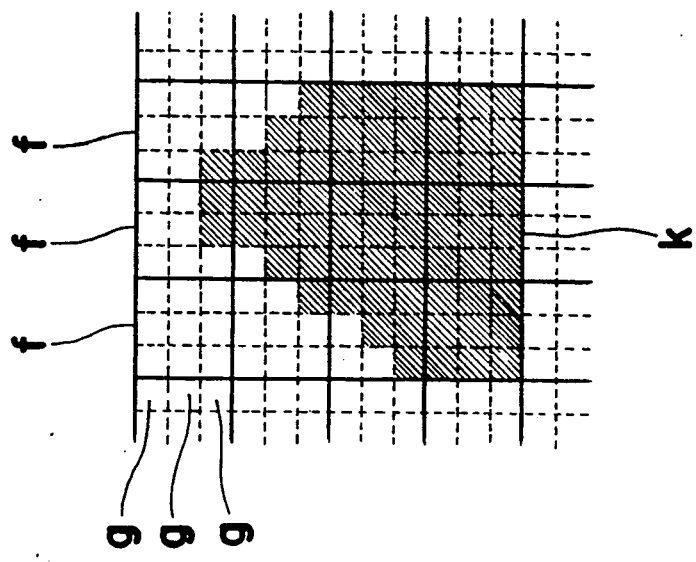

FIGS. 5(a) to 5(c) are diagrams showing states of data conversion by the data conversion circuit 55 referred to earlier.

In FIGS. 5(a) to 5(c), each of the smallest square regions surrounded by dotted lines represents a picture element g obtained by finely dividing the original D, while each of the larger square regions surrounded by solid lines shows an erasing unit section f. In FIG. 5(a), the region represented by hatching lines denotes, for example, the region constituted by the picture elements g judged as red by the color judging circuit 54 (designated image k), while the hatched regions in FIGS. 5(b) and 5(c) respectively represent the erasing regions 91 in which erasing of the latent image by the editing eraser 5 is to be effected.

The picture element pitch and erasing pitch are set as described above, and the erasing unit section f corresponds to nine image elements g in total constituting 3×3 picture element matrix. Accordingly, the data conversion circuit 55 stores the read color data for three lines inputted from the color judging circuit 54 in the order of arranged picture elements g, and selects the read color data S1 for three picture elements from each line, i.e. the read color data S1 of nine picture elements g in total. Subsequently, by the combination of the read color data S1 for the selected nine picture elements, through employment of the ROM table for the conversion incorporated in the data conversion circuit 55, the erase color data S2 corresponding to the erasing unit section f is obtained. In other words, one erasing color data S2 is formed from nine read color data.

For determining as to whether or not a certain erasing unit section f is to be included in the easing region, there are available various methods.

For example, there is one practice as shown in FIG. 5(b), by which all of the erasing unit sections f having even one picture element g corresponding to the designated image k are regarded as the erasing region 91, or another practice as shown in FIG. 5(c) wherein the erasing unit sections f in which the picture elements g corresponding to the designated images k of more than half (more than five pieces) are present, are set to be the erasing region 91.

In the actual practice, however, after considering various combinations such as kinds and arrangements of colors contained in one erasing unit section f, contents of the ROM table for the conversion referred to earlier are so set as to obtain a desired copied image based on visual characteristics.

The erase color data S2 thus formed and representing whether or not the erasing unit section f should be included in the erasing region 91 with respect to each color is applied to the image editing memory 56 and the limited color detecting circuit 57.

The editing memory 56 is constituted by a RAM capable of writing and reading the erase color data S2 for one sheet of the original D.

The ease color data S2 stored in the editing memory 56 is read out by the CPU 112 at proper time, whereby the display of the liquid crystal display 81 for the control panel 70, and the lighting control of the respective LED's 65 for the editing eraser 5 through the LED controller 113, are effected.

Moreover, signals from the cursor keys 82a to 82d and the execution key 83 are applied to the CPU 112, and in the case here correction of the erasing region 91 is effected as described earlier, the contents of the editing memory 56 are altered according to the correction.

The limited color detecting circuit 57 is intended to judge whether or not the erasing by the editing eraser 5 is required based on the contents of the erase color data S2 from the data conversion circuit 55. For example, in the case where color of the original image is only of black, if the functions for respective toners for yellow, magenta and cyan are omitted so as to effect development only by the black toner, the time required for forming the copied image may be shortened. Therefore, the limited color detecting circuit 57 stores the kinds of colors contained in the original D shown by the erase color data. During the copying function, the output of the limited color detecting circuit 57 is referred to by the main CPU through the CPU 112. It is to be noted here that the character generator 58 is intended to form specific character images.

Subsequently, procedures for image editing to form the designated color removed image will be described with reference to a flow-chart of FIG. 6.

In the first place, on the menu screen displayed on the liquid crystal display 81 as described earlier, through operation of the cursor keys 82a to 82d and the execution keys 83, setting of the image editing copy mode is effected, while the color of the image desired to be removed in the original D is designated (Step #11). Hereinbelow, description will be given on the assumption that for example, the red portion is designated as the designated image.

Thereafter, for detecting the color of the original image in advance, preliminary scanning of the original document D is effected (Step #12).

At Step #13, the erasing region 91 is displayed on the screen of the liquid crystal display 81 based on the erase color data S2 corresponding to the red color stored in the editing memory 56 in the preliminary scanning.

By the above operation, the operator can ensure the portion to be actually removed in the original image, before the copying operation is started. For correcting the erasing region 91 displayed on the screen of the liquid crystal display 81 (YES at Step #14), the correction is effected by the cursor keys 82a to 82d and the execution key 83 (Step #15). This relates, for example, to such a case where the portion in the other color located around the red color is undesirably removed since the erasing region 91 is larger than the designated image k, or where there is a portion not desired to be removed although it is red. Meanwhile, when it is judged that the desired copied image can not be obtained since the erasing region 91 is considerably spaced from the designated image k, it is also possible to suspend the formation of the designated color removed image.

Upon completion of the correction, or when it is not necessary to effect correction, the copying function is effected (Step #17) after confirmation therefor is made (Step #16).

It is to be noted here that for suspending the formation of the designated color removed image, the operator releases the copying mode to form the designated color removed image, whereby the copying apparatus 1 is set to the mode for effecting the ordinary copying function, and the stand-by state is continued until the portion key is depressed.

In the foregoing embodiment, the LED array employed as the light source for the editing eraser 5 may be replaced by other light sources such as a halogen lamp or laser light source, etc. Similarly, the contact type CCD sensor described as employed for the image sensor 51 may be replaced by a reducing type CCD sensor or further, by a known reading means such as a MOS image pick-up element and the like.

It should be noted here that in the foregoing embodiment, although the present invention has been mainly described with reference to the multi-color copying apparatus employing a plurality of colors of toner, the kinds of colors of the toner to be employed are not limited, and the concept of the present invention may be applied to a single color copying apparatus using only black toner. In this case, it may be so arranged, for example, that the contents of the ROM table provided in the data converting circuit 55 are set so as to determine the erasing region 91 according to the density of the original image, i.e. to form the edited image in which, for example, the dark portion is removed.

It should also be noted that, in the foregoing embodiment, the transfer belt 15 may be readily replaced by a transfer drum or the like, and that, instead of effecting the secondary transfer, the toner image on the surface of the photoreceptor drum 3 may be directly transferred onto the paper sheet P so as to form the color copied image through employment of a known paper re-feeding means such as an intermediate inverting unit, etc.

Furthermore, in the foregoing embodiment, the liquid crystal display 81 may be so modified as to display the designated image k finely divided into the picture elements g, in addition to the erasing region 91 in which the designated image k is finely divided into the erasing unit section f. In the above case, the designated image k and the erasing region 91 can be compared on the screen of the liquid crystal display 81, and thus, confirmation of the erasing region 91, i.e. foresight of the copied image to be formed may be more correctly effected.

As is seen from the foregoing description, according to one aspect of the present invention, the region to be actually removed in the original image may be ensured before effecting the copying operation for the image editing, and thus, unnecessary copying operation may be advantageously prevented.

In addition to the above event, according to another aspect of the present invention, it becomes possible to correct as desired, the region to be removed in the original image, and thus, diversification of the image editing may be achieved.

Figure 7:
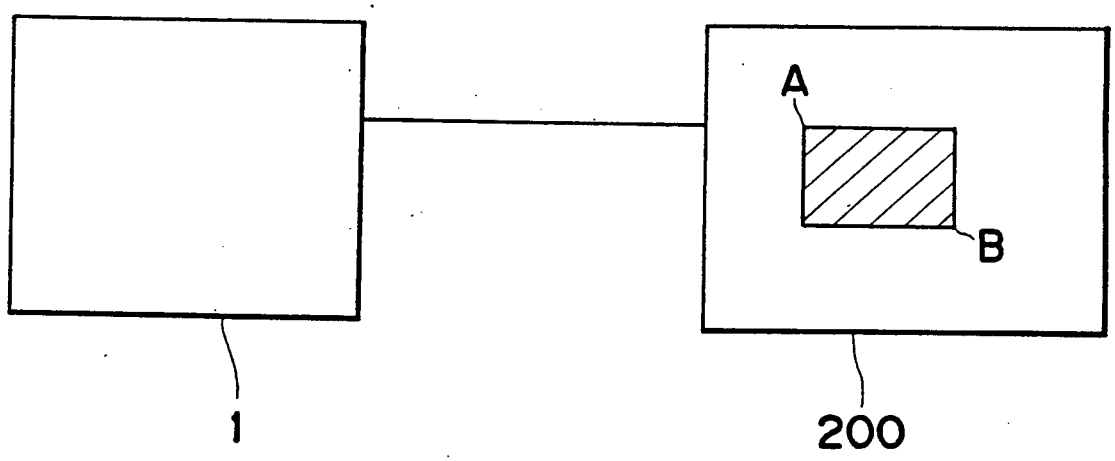
FIG. 7 is a schematic diagram showing an editor connected to a copying apparatus main body according to a further embodiment of the present invention.
Figure 8:
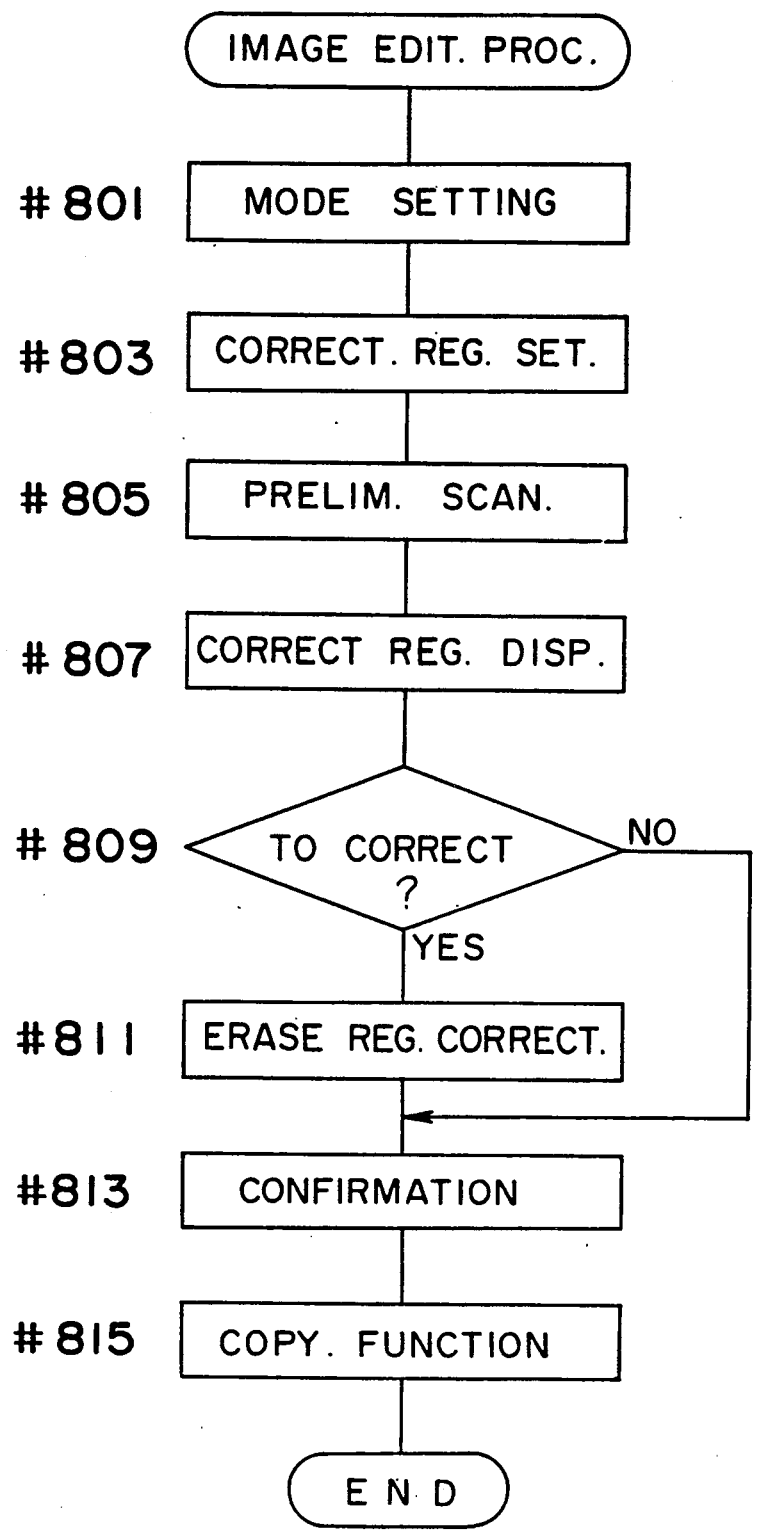
FIG. 8 is a flow-chart showing procedures for a system arranged to effect editing by designating part of the region of the original for display.

FIGS. 7 and 8 related to a second embodiment according to the present invention.

The copying apparatus according to the first embodiment of the present invention as described so far is arranged to display the entire region of the original on the liquid crystal display 81 through distinction between the erasing region and the image forming region.

Meanwhile, in the second embodiment of the present invention to be described hereinbelow with reference to FIGS. 7 and 8, it is so arranged that instead of displaying the whole region of the original, part of the original is adapted to be displayed on the liquid crystal display 81 for editing.

As one practice for inputting the region to be displayed on the display 81, there is available the input of coordinates X and Y by an editor as in FIG. 7, in which the copying apparatus main body 1 and the editor 200 connected thereto are schematically shown. In FIG. 7, through input of two points A and B, the editing region indicated by hatched lines is set, and the editing region thus set is displayed on the display 81 after preliminary scanning.

FIG. 8 shows a flow-chart showing the procedures for a system arranged to designate and display part of the region of the original for editing.

Step #801 Mode Setting

On the menu screen displayed on the liquid crystal display 81, the image editing copy mode is set through operation of the cursor keys 82a to 82d and the execution key 83.

When the image editing copy mode has been set, the color of the image desired to be eased in the original D is selected from the colors displayed on the liquid crystal display 81 through utilization of the cursor keys 82a to 82d and the execution key 83 (FIG. 4).

Step #803 correcting region setting

The two points A and B located at opposite ends of a diagonal line in FIG. 7 are inputted by the editor 200. The coordinate data for the correcting region are applied to the editing CPU 112 (FIG. 1) through the main CPU of the copying apparatus 1.

Step #805 Preliminary Scanning

For preliminarily detecting the color of the original image, preliminary scanning of the original is effected.

Step #807 Correcting region display

The CPU 112 displays the corrected region by discriminating the image forming region from the erasing region per each erasing pitch based on the applied coordinate data and the information from the image sensor 51 (FIG. 1).

Steps #809, #811, #813, and #815

Figure 6:
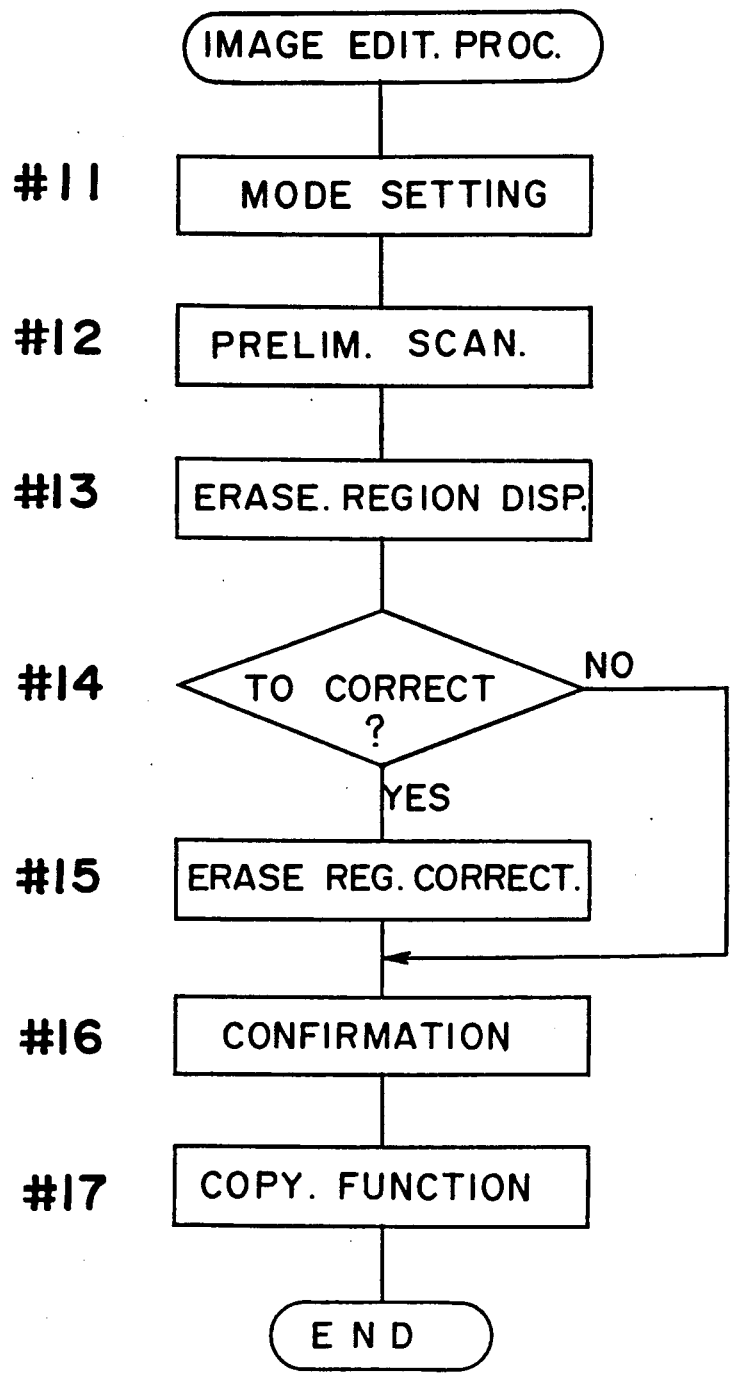
FIG. 6 is a flow-chart showing procedures for the image editing.

The procedures are similar to those in Steps #14 to #17 in FIG. 6, and therefore, detailed description thereof is abbreviated here for brevity of explanation.

In the foregoing procedures in FIG. 8, although the correcting region is arranged to be inputted from the editor 200 at Step #803, if no input is applied from the editor 200, entire scanning region of the original document is displayed.

The input of the correcting region may be set at a plurality of spots instead of setting at one place.

Since the size of the display is constant, with the correcting region being variable, in the case where the correcting region is small, alteration in the setting of the erasing region may be facilitated if it is so arranged to effect enlarged display to correspond to the size of the display.

Besides the input of the coordinates X and Y from the editor, it may be so arranged as to designate the region by the coordinate inputs X and Y by the ten-keys.

In the above embodiment, for example, in the case where red color is designated as the image color for erasing, if orange color portion, which is not desired to be erased, is present in the original, it is possible to designate the region containing orange as the correcting region (through input from the editor) so as to be displayed on the liquid crystal display 81, thereby to ensure whether the orange color portion is in the erasing region or in the image forming region.

Moreover, if it is included in the erasing region, the region may be changed to the image forming region.

Furthermore, as one practice for displaying part of the copying operation region of the original on the liquid crystal display 81, it may be so modified, for example, to divide the original into six equal square portions for successive display from the portion one to portion six.

In the above modification, operation may be more efficiently effected if it is so arranged to skip the portion not including the erasing region without displaying.

Although the present invention has been fully described by way of example with reference to he accompanying drawings, it is to be noted here that various changes and modifications will be apparent to those skilled in the art. Therefore, unless otherwise such changes and modifications depart from the scope of the present invention, they should be construed as included therein.

What is claimed is:

1. An image forming apparatus which comprises:
    an exposing means for projecting light onto an original so as to form an electrostatic latent image of an original image on a photosensitive surface of a photoreceptor;
    a reading means for reading the original image through separation thereof per predetermined color in a reading picture element unit;
    a designating means for designating the color to be erased;
    an erasing means for erasing desired region of the electrostatic latent image on the photosensitive surface of the photoreceptor per erasing picture element unit;
    a converting means for converting color data in the reading picture element unit into color data in the erasing picture element unit;
    a display means for displaying the region to be erased based on the color data in the erasing picture element unit, and
    a control means for controlling the erasing means based on the color data in the erasing picture element unit obtained, through conversion of the color designated by the designating means, by said converting means.

2. An image forming apparatus as claimed in claim 1, further comprising an erasing region changing means for changing color data in the erasing picture element unit per erasing picture element unit, said control means controlling said erasing means based on the color data in the changed erasing picture element unit.

3. An image forming apparatus as claimed in claim 1, wherein said display means displays the region for image formation and the region to be erased through distinction therebetween per erasing picture element unit.

4. An image forming apparatus as claimed in claim 1, wherein said display means displays part of the original image.

5. An image forming apparatus as claimed in claim 4, further comprising a display region changing means for changing the portion successively displayed on said display means.

6. An image forming apparatus as claimed in claim 4, further comprising a display region designating means for designating the region of the original image to be displayed on the display means by an editor.

7. An image forming apparatus as claimed in claim 1, wherein said display means displays the entire region of the original image.

8. An image forming apparatus as claimed in claim 1, wherein the reading picture element unit of said reading means is smaller than the erasing picture element unit of said erasing means.

9. An image forming apparatus which comprises:
    an electrostatic latent image forming means for forming an electrostatic static latent image corresponding to an original image on a photosensitive member;
    a designating means for designating desired region in the original image;
    an erasing means for erasing the electrostatic latent image on the photosensitive member by erasing picture element unit;
    a display means for displaying the designated region in the original by the erasing picture element unit; and
    a control means for controlling the erasing means so as to erase the region designated by said designating means.

10. An image forming apparatus as claimed in claim 9, further comprising a converting means for converting into region in the erasing picture element unit when the region designated by the designating means is inputted in a way other than the erasing picture element unit.

11. An image forming apparatus as claimed in claim 9, wherein said display means displays the entire original image.

12. An image forming apparatus as claimed in claim 9, further comprising a designated region changing means for changing between erasing and non-erasing in the designated region displayed on the display means by the erasing picture element unit.

13. An image forming apparatus as claimed in claim 9, wherein said display means displays the original image partially.

14. An image forming apparatus as claimed in claim 13, further comprising a display region designating means for designating the region of the original image displayed on the display means.

15. An image forming apparatus as claimed in claim 13, further comprising a display changing means for changing the display region displayed on said display means.

16. An image forming apparatus which comprises:
    an exposing means for projecting light onto an original so as to form an electrostatic latent image of an original image on a photosensitive surface of a photoreceptor;
    a reading means for reading the original image through separation thereof per predetermined color in a reading picture element unit;
    a designating means for designating the color to be erased;
    an erasing means for erasing desired region of the electrostatic latent image on the photosensitive surface of the photoreceptor per erasing picture element unit;
    a converting means for converting color data in the reading picture element unit into color data in the erasing picture element unit,
    a data changing means for changing color data in the erasing picture element unit, and
    a control means for controlling the erasing means based on the color data in the erasing picture element unit obtained through conversion of the color designated by the designating means, by said converting means.

17. An image forming apparatus which comprises:
    an electrostatic latent image forming means for forming an electrostatic latent image corresponding to an original image on a photosensitive member;

a designating means for designating desired region in the original image;

a reading means for reading the original image by a first size picture element unit to form a first image signal;

a converting means for converting the first image signal into a second image signal in a second size picture element unit;

a display means for displaying the designated region in the original by the second size picture element unit;

an erasing means for erasing the electrostatic latent image on the photosensitive member by the second size picture element unit; and a control means for controlling said erasing means according to the second image signal and the region designated by said designating means.

18. An image forming apparatus as claimed in claim 17, further comprising an image signal changing means for changing the second image signal, said control means controlling said erasing means according to the changed second image signal and the region designated by said designating means.

19. An image forming apparatus as claimed in claim 17, wherein said display means displays part of the original image, said image forming apparatus further comprising a display region designating means for designating the region of the original image to be displayed by said display means.

20. A copying method employing an image forming apparatus which includes an electrostatic latent image forming means for forming an electrostatic latent image corresponding to an original image on a photosensitive member, a designating means for designating a desired region, an erasing means for erasing the electrostatic latent image on the photosensitive member by a first size picture element section, and a display means, and comprising steps of:

changing the designated region into the erasing region constituted by the first size picture element section; and displaying the changed erasing region on the display means.

21. A copying method as claimed in claim 20, further comprising the step of changing the erasing region displayed on the display means per each first size picture element section, into another region.

22. A copying method as claimed in claim 20, further comprising the step of reading the original image in the second size picture element unit by a reading means provided in the image forming apparatus, said designating means designating the region based on the read data.

* * * * *